United States Patent [19]

Rapp et al.

[11] 4,240,744
[45] Dec. 23, 1980

[54] PHOTOGRAPHIC COPYING MACHINE WITH INTERCHANGEABLE FORMAT MASKS

[75] Inventors: Heinz Rapp, Munich; Ernst Biedermann, Taufkirchen; Dieter Wittenbrink, Munich, all of Fed. Rep. of Germany

[73] Assignee: AGFA-Gevaert, A.G., Leverkusen, Fed. Rep. of Germany

[21] Appl. No.: 863,867

[22] Filed: Dec. 23, 1977

[30] Foreign Application Priority Data

Dec. 30, 1976 [DE] Fed. Rep. of Germany ....... 2659449

[51] Int. Cl.³ .................. G03B 27/58; G03B 27/62
[52] U.S. Cl. ........................... 355/74; 355/75; 335/206; 335/207; 361/171
[58] Field of Search ............. 355/72, 74, 75, 76, 355/73; 335/207, 206; 361/171, 172

[56] References Cited

U.S. PATENT DOCUMENTS

| | | | |
|---|---|---|---|
| 3,325,756 | 6/1967 | Maxwell | 335/207 |
| 3,488,119 | 1/1970 | Dixon et al. | 355/74 |
| 3,506,939 | 4/1970 | Hesser et al. | 335/206 |
| 3,588,766 | 6/1971 | Baermann | 335/207 |
| 3,622,922 | 11/1971 | Mogi et al. | 335/207 |

*Primary Examiner*—Richard A. Wintercorn
*Assistant Examiner*—W. J. Brady
*Attorney, Agent, or Firm*—Peter K. Kontler

[57] ABSTRACT

A photographic copying machine wherein any one of a series of masks, each having a differently dimensioned light-transmitting opening, can be placed onto a locating plate which supports a battery of fixedly mounted or mobile magnetic actuators for discrete electric switching elements. Each mask carries a different array of soft magnets which displace or otherwise influence a group of actuators so that the thus influenced actuators open or close the associated switching elements which adjust the exposure controls and/or another system of the copying machine in dependency on the size and/or shape of the opening in the selected mask. The soft magnets on each mask influence a different group (e.g., a different number) of actuators each of which is an H-shaped permanent magnet.

13 Claims, 4 Drawing Figures

U.S. Patent    Dec. 23, 1980    4,240,744
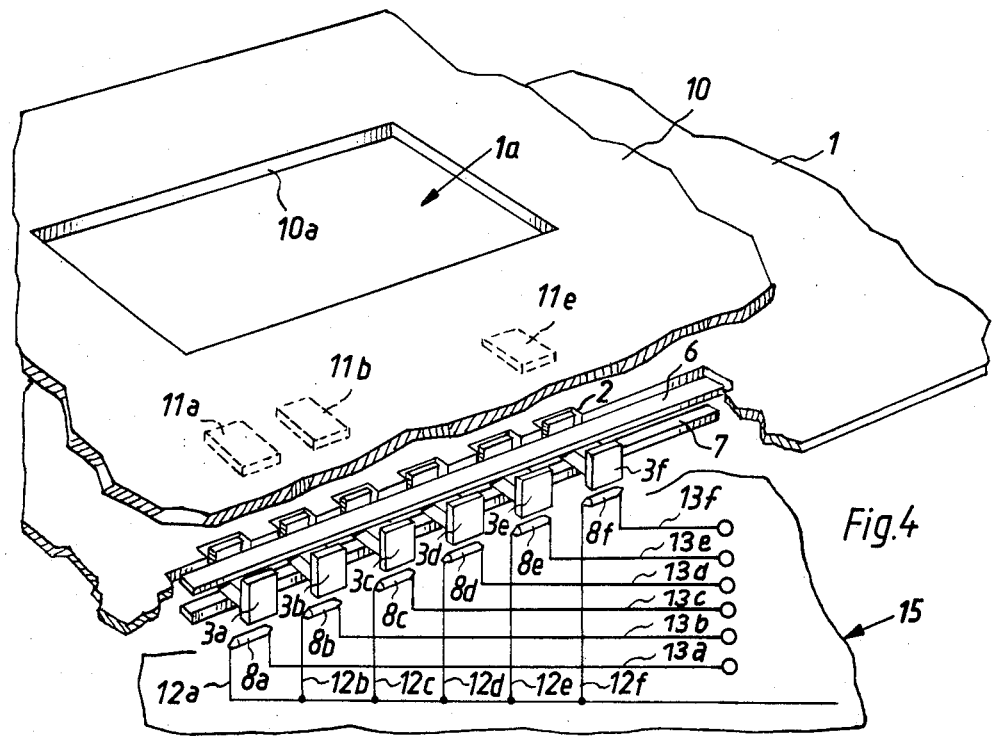
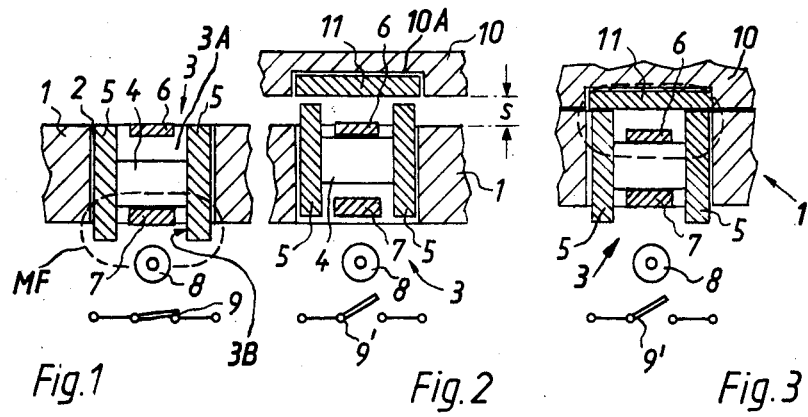
Fig.1    Fig.2    Fig.3

PHOTOGRAPHIC COPYING MACHINE WITH INTERCHANGEABLE FORMAT MASKS

BACKGROUND OF THE INVENTION

The present invention relates to copying machines in general, especially to photographic copying machines, and more particularly to improvements in copying machines of the type wherein any one of a series of masks, each having a differently dimensioned and/or configurated light-transmitting opening, can be inserted into or placed onto the machine to determine the format of reproductions and/or that portion or those portions of an original whose image is to be reproduced.

It is known to provide a photographic copying machine with a plurality of holders having different light-transmitting openings for different formats of originals, e.g., for small, medium-sized or large film frames. As a rule, each holder carries or embodies indicia whose number and/or distribution is indicative of the size and/or configuration of the respective opening. The indicia serve to actuate electric switches or analogous elements which, in turn, adjust the copying machine for proper reproduction of images of originals whose format determines the selection of a particular holder. A holder will be replaced by a different holder when the copying of smaller originals is to be followed by copying of larger originals, or when the machine is to make enlargements of smaller or larger portions of originals having one and the same size.

It is also known to employ shiftable strip- or web-like masks which overlie the photographic paper at the copying station and to properly adjust the exposure controls of the copying machine in automatic response to shifting of the masks. Automatic shifting of a web or band of masks must be carried out in dependency on the format of the originals. To this end, German Pat. No. 1,209,871 proposes to provide the masks for originals with indicia in the form of recesses or bores which can receive spring-biased pin-shaped movable portions of electric switches. The switches are connected with an evaluating circuit which adjusts the exposure controls as a function of the number and/or distribution of switches which are actuated by a selected mask. A drawback of such proposal is that the evaluating circuit is expensive, complex and sensitive. Moreover, the automatic system is rather bulky which presents problems because the system must be installed in or on that portion of a copying machine where the space is at a premium.

OBJECTS AND SUMMARY OF THE INVENTION

An object of the invention is to provide a photographic copying machine with novel and improved means for automatically adjusting the exposure controls and/or other systems of the machine in response to placing of any one of a series of masks in requisite position for the making of reproductions of originals having a format which determines the selection of the mask.

Another object of the invention is to provide a compact and relatively simple assembly for effecting appropriate adjustments of exposure controls and/or other systems of a photographic copying machine in response to proper positioning of a selected mask at the copying station.

A further object of the invention is to provide novel and improved switch actuators for use in the improved copying machine.

An additional object of the invention is to provide the copying machine with means for reliably adjusting certain systems in response to placing of a selected mask in an optimum position for the reproduction of images of portions of or entire originals having a given format.

A further object of the invention is to provide novel and improved masks which can be used in the above outlined copying machine and which insure automatic adjustment of exposure controls in response to movement to a predetermined position at the copying station.

One feature of the invention resides in the provision of a combination which is incorporated in or associated with a photographic copying machine of the type wherein the configuration and/or dimensions of the opening in a selected one of a series of masks with openings of different size and/or shape determine the size and/or shape of the image which is reproduced on a photosensitive material and wherein each mask is provided with indicia or markers denoting the size and/or shape of the respective opening. The combination comprises a plate or analogous locating means for a selected mask, a plurality of magnetically actuatable switching elements (each of which may include a reed contact or a Hall effect generator) which form a plurality of groups, one for each mask of the series, and means for magnetically actuating the corresponding group of switching elements in response to placing of a selected mask in a predetermined position with respect to the locating means. The actuating means includes a battery of magnetic actuators adjacent to the locating means and each associated with one of the switching elements. The indicia of a mask which is moved to the predetermined position are adjacent to the actuators for the corresponding group of switching elements and are operative (e.g., by constituting soft magnets) to effect the actuation of corresponding switching elements by way of the adjacent actuators on placing of the selected mask in predetermined position.

The actuators may be fixedly or movably mounted directly in or on the locating means, and each thereof may constitute a substantially H-shaped permanent magnet one U-shaped section or half of which can be influenced by an adjacent indicium and the other U-shaped section or half of which can actuate the respective switching element.

The novel features which are considered as characteristic of the invention are set forth in particular in the appended claims. The improved copying machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of a locating device for format masks and a sectional view of a magnetic actuator for a switching element;

FIG. 2 illustrates the structure of FIG. 1, with the actuator shown in a different position which it assumes in response to placing of a mask in a predetermined position with respect to the locating device;

FIG. 3 is a fragmentary sectional view of the locating device and a sectional view of an actuator which is fixedly mounted in the locating device; and FIG. 4 is a fragmentary perspective view of a photographic copying machine with a mask in a predetermined position with respect to the locating device and further showing a battery of magnetic actuators and associated switching elements.

DESCRIPTION OF THE PREFERRED EMBODIMENTS

Referring to FIG. 1, there is shown a portion of a plate-like locating device 1 for a series of masks 10 one of which is shown in FIG. 2. The locating device 1 (hereinafter called plate for short) further serves to support a battery of mobile magnetic actuators 3 for electric switching elements. The switching element which is shown in FIG. 1 comprises a reed contact 8 and a mobile contact 9 between two fixed terminals. When the actuator 3 of FIG. 1 assumes the illustrated lower end position (under the action of gravity), it causes the reed contact 8 to maintain the contact 9 in closed position. The actuator 3 is reciprocable up and down in a suitably configured cutout 2 of the plate 1 and is a permanent magnet which comprises a centrally located main portion or core 4 as well as two soft magnet pole shoes 5 which extend upwardly and downwardly beyond the core 4 so that the actuator resembles the letter H, i.e., it is composed of two mirror symmetrical U-shaped halves or sections. The upper U-shaped section of the actuator 3 defines a first recess or socket 3A, and the lower section defines a second recess or socket 3B. The upper socket 3A receives, with certain clearance, a first retaining strip 6 and the lower socket 3B receives, again with certain clearance, a second retaining strip 7. The latter serves as a stop or base on which the core 4 rests when the actuator 3 is permitted to assume the lower end position of FIG. 1. The upper strip 6 limits the extent of upward movement of the core 4 in response to placing of a selected mask 10 onto the plate 1 (see FIG. 2). Thus, the strips 6, 7 confine the actuator 3 to movement between preselected first and second positions. The underside of the mask 10 has a recess 10A for a small soft magnet plate or insert 11 which constitutes an indicium or marker forming part of means which denotes the size and/or shape of the light-admitting opening (see 10a in FIG. 4) of the mask 10. When the marker 11 assumes the position of FIG. 2, the magnetic field MF which is produced by the lower U-shaped section of the actuator 3 rises above the contact 8 so that the latter causes or allows the contact 9 to assume the open position 9'. The extent of reciprocatory movement of the actuator 3 is shown in FIG. 2, as at "s".

The reed contact 8 constitutes but one form of means which can influence the contact 9 to change its position in order to open or close the switching element, depending on the position of the actuator 3. For example, the contact 8 can be replaced with a Hall effect generator or with a field effect transistor of any known design.

The marker 11 of FIG. 2 overlies both pole shoes 5 of the actuator 3 therebelow. The force with which the marker 6 attracts the actuator 3 suffices to lift the latter to the position of FIG. 2 whereby the actuator influences the switching element 8, 9 in such a way that the contact 9 assumes the open position 9'. The stroke "s" of the actuator 3 suffices to insure that the magnetic field MF ceases to influence the contact 8 when the core 4 abuts against the underside of the upper retaining strip 6.

FIG. 3 shows a modified mounting for the actuator 3. The distance between the retaining strips 6 and 7 is reduced to such an extent that the actuator 3 remains in the illustrated position regardless of whether or not its upper U-shaped section is approached by or is remote from the marker 11 of the mask 10 thereabove. The marker 11 of FIG. 3 is immediately adjacent to the upper portions of the pole shoes 5 so that it short-circuits the two pole shoes. This weakens the magnetic field which is produced by the lower U-shaped section of the actuator 3 to such an extent that the contact 8 is not influenced by the magnetic field, i.e., the contact 9 is allowed or caused to assume the open position 9'.

FIG. 4 shows a portion of a photographic copying machine which embodies the plate 1. The plate 1 has an aperture 1a which is large enough to register with the opening 10a of that mask 10 which is formed with an opening of maximum size. The illustrated mask 10 may form part of a web of aligned masks each of which has a differently dimensioned and/or configurated opening. The shape and/or dimensions of the opening 10a in each mask 10 are denoted by one or more indicia or markers 11. In FIG. 4, the mask 10 which is located on the plate 1 has three markers 11a, 11b and 11e whereby the distance between the markers 11b and 11e exceeds the distance between the markers 11a and 11b. This means that, when the mask 10 is properly located in a predetermined position with respect to the aperture 1a, its markers 11a, 11b, 11e respectively register with the actuators 3a, 3b and 3e of a battery or row of six equally spaced actuators 3a to 3f. These actuators are mounted in a manner as shown in FIGS. 1-2 or in a manner as shown in FIG. 3, i.e., their cores 4 may but need not have any freedom of vertical movement between the adjacent portions of the retaining strips 6 and 7. It is assumed that the actuators 3a to 3f are mounted in a manner as shown in FIGS. 1-2, i.e., that their cores 4 are received with clearance ("s") between the adjacent portions of the strips 6 and 7. The strips 6 and 7 are secured to the plate 1. The cutouts 2 of the plate 1 prevent lateral or other stray movements of the actuators.

Each of the six actuators 3a to 3f is located above one of six discrete reed contacts 8a to 8f. These contacts are mounted in or on a plate-like support 15 which further carries a number of conductors 12a to 12f and 13a to 13f. The conductors may form part of a suitable printed circuit.

When the mask 10 is moved to the predetermined position for transmission of light which passes from a light source through an original (whose format determines the selection of the mask), through the opening 10a and through the aperture 1a to impinge upon the photosensitive layer of photographic paper or the like, the markers 11a, 11b and 11e are sufficiently close to the corresponding group of actuators 3a, 3b, 3e to enable these actuators to influence the respective group of contacts 8a, 8b and 8e. The switching elements including the contacts 8a, 8b and 8e open and the switching elements including the contacts 8c, 8d and 8f remain closed. The evaluating circuit which includes or is connected to the conductors 12a–12f and 13a–13f then effects an appropriate adjustment of the mask (not shown) for photographic paper and/or an appropriate adjustment of exposure controls in the copying machine.

Another mask may include only one, two, four or more markers 11. Thus, each of a series of masks comprises a different set of markers whose number and/or distribution is indicative of the size and/or shape of the respective opening. By employing a battery of six actuators and an equal number of switching elements, one for each actuator, the structure of FIG. 4 can properly identify sixtyfour different masks. It is clear, however, that the number of actuators and switching elements can be increased or reduced, depending on the maximum number of masks which are contemplated for use in the copying machine.

An important advantage of the aforedescribed structure is that its components take up a minimum of space. Thus, the markers 11 can be recessed into the respective masks 10 and the actuators 3 can be mounted directly in the plate 1 which locates and supports a selected mask in predetermined position. The space requirements are reduced still further if the actuators 3 are mounted in a manner as shown in FIG. 3, i.e., so that they are held against movement with respect to the plate 1. Furthermore, the magnetic force of the markers and/or actuators can be readily selected in such a way that the actuators cause the respective switching elements to open or close even if the markers and/or actuators are not mounted with a maximum degree of precision. In fact, the markers 11 will be capable of properly influencing the respective switching elements via corresponding actuators even if they are inclined or otherwise misoriented with respect to the adjacent actuators. It is further within the purview of the invention to employ markers of such design or to intentionally mount the markers in such a way that they are not exactly parallel to the cores 4 of the adjacent actuators when the respective mask is moved to predetermined position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. In a photographic copying machine wherein the configuration and/or dimensions of the opening in a selected one of a series of masks with openings of different size and/or shape determine the size and/or shape of the image which is reproduced on a photosensitive material and wherein each mask is provided with indicia denoting the size and/or shape of the respective opening, the combination of locating means for a selected mask; a plurality of magnetically actuatable switching elements, said switching elements forming a plurality of groups, one for each of said series of masks; and means for magnetically actuating the corresponding group of switching elements in response to placing of a selected mask in a predetermined position with respect to said locating means, including a battery of magnetic actuators adjacent to said locating means and each associated with one of said switching elements, the indicia of the mask in said predetermined position being situated adjacent to the actuators for the corresponding group of switching elements and across the respective actuators from the corresponding switching elements and being operative to effect the actuation of the corresponding switching elements by way of the adjacent actuators on placing of the selected mask in said predetermined position.

2. The combination of claim 1, wherein said switching elements include reed contacts.

3. The combination of claim 1, wherein said switching elements include Hall effect generators.

4. The combination of claim 1, wherein said switching elements include field effect transistors.

5. The combination of claim 1, wherein each of said actuators includes a permanent magnet having a main portion and two pole shoes extending from said main portion.

6. The combination of claim 5, wherein each of said permanent magnets is substantially H-shaped.

7. The combination of claim 5, wherein said indicia include soft magnets which are adjacent to the pole shoes of corresponding permanent magnets when the selected mask is moved to said predetermined position whereby the indicia of such mask influence the magnetic fields of the respective permanent magnets, said switching elements being adjacent to the corresponding permanent magnets and the influence of magnetic fields upon the adjacent switching elements on placing of indicia next to the respective permanent magnets being altered sufficiently to effect the actuation of corresponding switching elements.

8. The combination of claim 1, wherein said locating means includes means for movably supporting said actuators.

9. The combination of claim 1, further comprising a common support for said switching elements and conductor means provided on said support and connected to said switching elements.

10. In a photographic copying machine wherein the configuration and/or dimensions of the opening in a selected one of a series of masks with openings of different size and/or shape determine the size and/or shape of the image which is reproduced on a photosensitive material and wherein each mask is provided with indicia denoting the size and/or shape of the respective opening, the combination of locating means for a selected mask; a plurality of magnetically actuatable switching elements, said switching elements forming a plurality of groups, one for each of said series of masks; and means for magnetically actuating the corresponding group of switching elements in response to placing of a selected mask in a predetermined position with respect to said locating means, including a battery of magnetic actuators adjacent to said locating means and each associated with one of said switching elements, and including a permanent magnet having a main portion and two pole shoes extending from said main portion, and two substantially U-shaped sections one of which is adjacent to the respective switching element and the other of which is adjacent to an indicium when the corresponding mask is moved to said predetermined position, the indicia of the mask in said predetermined position adjacent to the actuators for the corresponding group of switching elements and being operative to effect the actuation of the corresponding switching elements by way of the adjacent actuators on placing of the selected mask in said predetermined position, said indicia including soft magnets which are adjacent to the pole shoes of corresponding permanent magnets when the selected mask is moved to said predetermined position whereby the indicia of such mask influence the magnetic fields of the respective permanent magnets, said switching elements being adjacent to the corresponding permanent magnets and the influence of magnetic fields upon the adjacent switching elements on placing of indicia next to the respective permanent magnets being altered sufficiently to effect the actuation of corresponding switching elements.

11. In a photographic copying machine wherein the configuration and/or dimensions of the opening in a selected one of a series of masks with openings of different size and/or shape determine the size and/or shape of the image which is reproduced on a photosensitive material and wherein each mask is provided with indicia denoting the size and/or shape of the respective opening, the combination of locating means for a selected mask; a plurality of magnetically actuatable switching elements, said switching elements forming a plurality of groups, one for each of said series of masks; means for magnetically actuating the corresponding group of switching elements in response to placing of a selected mask in a predetermined position with respect to said locating means, including a battery of magnetic actuators adjacent to said locating means and each associated with one of said switching elements and including a permanent magnet having a main portion and two pole shoes extending from said main portion, said pole shoes and said main portion of each of said permanent magnets defining first and second sockets at the opposite sides of the main portion, the indicia of the mask in said predetermined position being adjacent to the actuators for the corresponding group of switching elements and being operative to effect the actuation of the corresponding switching elements by way of the adjacent actuators on placing of the selected mask in said predetermined position; and stationary first and second retaining means received with clearance in the corresponding sockets of said permanent magnets to permit limited movement of said magnets between first and second positions in one of which said magnets actuate the corresponding switching elements, said indicia including soft magnets each arranged to move the adjacent permanent magnet to said one position on movement of the selected mask to said predetermined position.

12. The combination of claim 11, wherein each of said permanent magnets assumes the other of said first and second positions by gravity when not influenced by an indicium.

13. In a photographic copying machine wherein the configuration and/or dimensions of the opening in a selected one of a series of masks with openings of different size and/or shape determine the size and/or shape of the image which is reproduced on a photosensitive material and wherein each mask is provided with indicia denoting the size and/or shape of the respective opening, the combination of locating means for a selected mask, including means for movably supporting said actuators; a plurality of magnetically actuatable switching elements, said switching elements forming a plurality of groups, one for each of said series of masks; means for magnetically actuating the corresponding group of switching elements in response to placing of a selected mask in a predetermined position with respect to said locating means, including a battery of magnetic actuators adjacent to said locating means and each associated with one of said switching elements, the indicia of the mask in said predetermined position being adjacent to the actuators for the corresponding group of switching elements and being operative to effect the actuation of the corresponding switching elements by way of the adjacent actuators on placing of the selected mask in said predetermined position; and means for confining said actuators to movement between first and second positions, said actuators being arranged to assume said first positions under the influence of gravity and said second positions under the influence of indicia on a mask which is moved to said predetermined position.

* * * * *